(12) United States Patent
Martin

(10) Patent No.: US 11,716,053 B1
(45) Date of Patent: Aug. 1, 2023

(54) SOLAR PANEL SNOW MELTER

(71) Applicant: Joel D. Martin, LLC, Missoula, MT (US)

(72) Inventor: Joel D. Martin, Missoula, MT (US)

(*) Notice: Subject to any disclaimer, the term of this patent is extended or adjusted under 35 U.S.C. 154(b) by 0 days.

(21) Appl. No.: 17/832,656

(22) Filed: Jun. 5, 2022

(51) Int. Cl.
*H01L 31/042* (2014.01)
*H02S 10/00* (2014.01)
*H02S 40/12* (2014.01)

(52) U.S. Cl.
CPC .................... *H02S 40/12* (2014.12)

(58) Field of Classification Search
CPC ............... H02S 40/12; Y10S 454/90
USPC ................................ 136/243–265
See application file for complete search history.

(56) References Cited

U.S. PATENT DOCUMENTS

| | | | |
|---|---|---|---|
| 5,368,654 A | 11/1994 | Bergevin et al. | |
| 8,360,050 B1 | 1/2013 | Albritton | |
| 9,605,880 B2 | 3/2017 | Van Straten | |
| 9,882,527 B2 | 1/2018 | Youn | |
| 10,253,990 B2 | 4/2019 | Lester | |
| 10,749,465 B2 | 8/2020 | Iyer | |
| 10,985,692 B2 | 4/2021 | Chakra et al. | |
| 2009/0040750 A1* | 2/2009 | Myer ...................... | F21S 9/037 136/246 |
| 2015/0021310 A1* | 1/2015 | Van Straten ............ | H02S 40/40 219/213 |
| 2015/0263669 A1 | 9/2015 | Youn | |
| 2017/0130969 A1 | 5/2017 | Lester | |
| 2018/0175786 A1 | 6/2018 | Iyer | |
| 2020/0099333 A1 | 3/2020 | Chakra et al. | |
| 2020/0350855 A1 | 11/2020 | Iyer | |

* cited by examiner

*Primary Examiner* — Angelo Trivisonno
(74) *Attorney, Agent, or Firm* — Antoinette M. Tease

(57) ABSTRACT

A solar panel apparatus having an upper frame and a lower frame, the upper and lower frames being pivotally connected to one another via a hinge. The upper frame contains a solar panel, and the lower frame contains a plurality of louvres. The plurality of louvres is configured to rotate as the angle of the upper frame is adjusted relative to the sun. Dividing walls inside each of the upper and lower frames are configured to allow warm air to flow from behind the louvres, which are black on their front faces to absorb solar rays, upward to behind the solar panel, thereby warming the solar panel and melting any snow or ice from the front surface of the solar panel. Air vents in both the upper and lower frames prevent the apparatus from overheating.

13 Claims, 18 Drawing Sheets

SOLAR PANEL SNOW MELTER

BACKGROUND OF THE INVENTION

1. Field of the Invention

The present invention is related to the field of solar panel arrays, and more particularly, to a solar panel apparatus that is configured to melt snow to prevent it from accumulating on the solar panels.

2. Description of the Related Art

In the winter, snow will often accumulate on solar panels at residential or commercial installations. When this happens, the sun's rays are unable to reach the photovoltaic panels, thereby preventing them from charging. Even if a snowfall is followed by a series of sunny days, it can still take a long time for the snow to melt off and full power production to resume. The present invention is designed to accelerate the snow melting process without consuming electrical power generated by the solar panels, risking damage to the solar panels, or requiring frequent action by an operator. None of the inventions described below accomplishes these three objectives.

U.S. Pat. No. 5,368,654 (Bergevin et al., 1994) discloses a photovoltaic system that uses reflected solar rays to dispose of snow, frost and ice on the solar panels. The invention comprises a casing with a plurality of solar cells mounted on it. The front of the casing has a light-transmitting panel for transmitting solar light to the solar cells. The rear of the casing is a double wall consisting of a first wall and a second wall. The first wall is in contact with the back side of the solar cells and, on its side facing away from the solar cells, has an opaque, dark-colored, solar-light-absorbing surface that generates heat. The second wall is a light-transmitting enclosure spaced apart from the dark-colored side of the first wall to produce a greenhouse effect.

U.S. Pat. No. 8,360,050 (Albritton, 2013) provides a method and system for operating a thermal solar system using a reverse motor configuration for thawing ice. The method includes operating a fan device coupled to a drive device in a first direction to cause fluid flow from a second region to a first region of a thermal array. The first region of the thermal array comprises a plenum. The method further includes transferring thermal energy to the thermal array using the flow of fluid from the second region to the first region.

U.S. Pat. No. 9,605,880 (Van Straten, 2017) discloses a solar collection device comprising a solar panel, a frame, a back panel, and a heat source. The back panel is affixed to a rear surface of the frame to provide an air chamber between the solar panel, frame and back panel. The heat source communicates with the chamber to heat the solar panel and melt ice from the solar panel.

U.S. Pat. No. 9,882,527 (Youn, 2018) provides a solar thermal collector with side surfaces and a bottom supported by a support frame in the shape of a square shifter. The solar thermal collector comprises a reverse bias circuit. An angle controller adjusts the tilting angle of the solar thermal collector. The angle controller comprises a hinge shaft, a slider, a vertical transfer shaft that is spirally engaged with the slider, and a bevel gear. The bevel gear is configured to transfer the force of a motor to the vertical transfer shaft.

U.S. patent application Ser. No. 10/253,990 (Lester, 2019) discloses a heating system comprised of a main body with a sealed cavity that contains a fluid in both liquid and gas phases. The heat exchange panel is configured to communicate heat energy by allowing evaporation of the liquid at one location and condensation of the liquid at a different location within the cavity. The system is operated via a controller that is configured to actuate various pumps and valves. In a first fluid circuit, the system pumps fluid through the heat exchange panel and a first side of the heat pump. In a second fluid circuit, the system pumps fluid through the heat tank and the second side of the heat pump. The heat pump transfers heat energy from the first fluid circuit to the second fluid circuit.

U.S. Pat. No. 10,749,465 (Iyer, 2020) and U.S. Patent Application Pub. No. 20200350855 (Iyer) provide solar energy collection panel cleaning system. The system comprises a solar panel, one or more fluid reservoirs, a fluid dispenser, a mechanism for providing pressurized fluid to the fluid dispenser from the fluid reservoir(s), and a mechanism for dispensing the fluid. The solar panel is cleaned periodically as a result of various conditions, including detected precipitant accumulation. The fluid is preferably heated water that is dispensed by an electrically heated nozzle.

U.S. Pat. No. 10,985,692 (Chakra et al., 2021) discloses a system and method for heating the surface of a solar panel. The system includes a heat source and a processor. The processor determines the amount of energy necessary to remove accumulated material (snow, ice, etc.) on the surface of the solar panel, calculates whether the benefit for utilization of the solar panel surface is greater than the amount of heating energy required to free the panel of accumulated material, and controls the heat source to apply a determined amount of heating energy to the surface of the solar panel. The controller repeatedly evaluates whether the benefit for surface utilization is greater than the amount of heating energy required.

BRIEF SUMMARY OF THE INVENTION

The present invention is a solar panel apparatus comprising: an upper frame having a front surface; a lower frame having a front surface; a support base; and a mast; wherein the front surface of the upper frame is pivotally connected to the front surface of the lower frame via a first hinge; wherein the upper frame comprises a top wall, a first side wall, and a second side wall; wherein the top wait of the upper frame comprises a first end and a second end; wherein the first end of the top wall of the upper frame is attached to a top end of the first side wall, and the second end of the top wall is attached to a top end of the second side wall; wherein the top wall, first side wall and second side wall of the upper frame are configured to form a first interior cavity; wherein the lower frame comprises a bottom wall, a first side wall, and a second side wall; wherein the bottom wall of the lower frame comprises a first end and a second end; wherein the first end of the bottom wall of the lower frame is attached to a bottom end of the first side wall, and the second end of the bottom wall is attached to a bottom end of the second side wall; wherein the bottom wall, first side wall and second side wall of the lower frame are configured to form a second interior cavity; wherein the support base is configured to support the mast in an upright position; wherein a solar panel comprised of a plurality of photovoltaic cells is situated at a front part of the upper frame; wherein a plurality of louvres is situated inside of the second interior cavity; wherein the lower frame further comprises a front panel that is comprised of a material that allows solar rays to penetrate the front panel and hit the louvres; wherein a first dividing wall is situated within the upper frame in between the solar panel and a back panel of the upper frame; wherein the first dividing wall is configured to create a first gap between a top edge of the first dividing wall and an inner surface of the top wall of the upper frame; wherein a second dividing wall is situated within the lower frame between the front panel and a back panel of the lower frame; and wherein the second dividing wall is configured to create a second gap between a bottom edge of the second dividing wall and an inner surface of the bottom wall of the lower frame.

In a preferred embodiment, each of the upper frame and the lower frame is rectangular in shape. Preferably, the first hinge extends across an entire width of a bottom end of the front surface of the upper frame and an entire width of a top end of the front surface of the lower frame. In a preferred embodiment, the bottom end of the first side wall of the upper frame is cut at an angle such that a front end of the first side wall is longer than a rear end of the first side wall; the bottom end of the second side wall of the upper frame is cut at an angle such that a front end of the second side wall is longer than a rear end of the second side wall; the top end of the first side wall of the lower frame is cut at an angle such that a front end of the first side wall is longer than a rear end of the first side wall; and the top end of the second side wall of the lower frame is cut at an angle such that a front end of the second side wall is longer than a rear end of the second side wall.

In a preferred embodiment, the invention further comprises: a first protective cover that is connected to the bottom end of the first side wall of the upper frame and a top part of the first side wall of the lower frame; and a second protective cover that is connected to the bottom end of the second side wall of the upper frame and a top part of the second side wall of the lower frame. In another preferred embodiment, the invention further comprises a lever arm that is pivotally attached at a distal end of the lever arm to a bottom part of the lower frame via a first bracket. Preferably, a top end of the mast is pivotally attached to a second bracket; and the second bracket is configured to support the back panel of the upper frame.

In a preferred embodiment, each louvre in the plurality of louvres has a front surface and a rear surface; and the front surface of each louvre is black, and the rear surface of each louvre is white. Preferably, each louvre in the plurality of louvres pivots about a horizontal axis; and the individual louvres within the plurality of louvres are stacked on top of one another in a vertical configuration. Two first tensions springs are preferably attached at one end of each spring to a bottom part of the first dividing wall arid at another end of each spring to an outer flap; and a top part of the outer flap is preferably attached to a bottom edge of the back panel via a second hinge.

In a preferred embodiment, the invention further comprises a bracket assembly that is configured to maneuver the plurality of louvres between a first position and a second position. Preferably, two first tension springs are attached at one end of each spring to a top part of an inner flap and at another end of each spring to a bottom part of the upper frame; and a top part of the inner flap is attached to a bottom edge of the first dividing wall via a third hinge. The back panel of the upper frame preferably comprises a first air vent and the back panel of the lower frame preferably comprises a second air vent; and each of the first and second air vents is preferably configured to open as air within the first and second cavities increases in temperature and to close as air within the first and second cavities decreases in temperature.

REFERENCE NUMBERS

Figure 1:
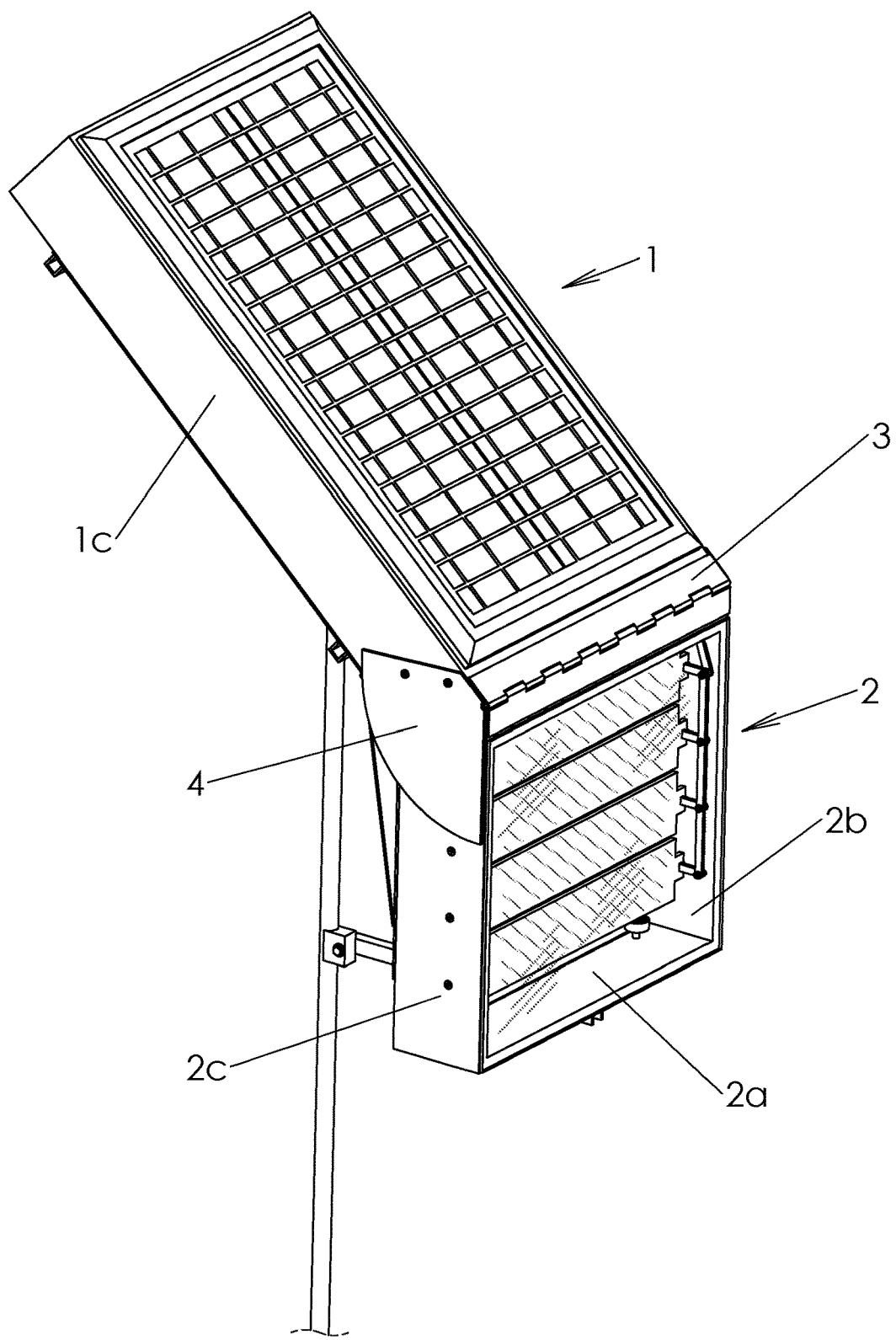
FIG. 1 is a front perspective view of the present invention shown in a first position.

1 Upper frame (with solar panel 11 installed)
1a Top wall (of upper frame)
1b First side wall (of upper frame)
1c Second side wall (of upper frame)
1d Front end (of side wall)
1e Rear end (of side wall)
1f Bottom part (of upper frame)
2 Lower frame
2a Bottom wall (of lower frame)
2b First side wall (of lower frame)
2c Second side wall (of lower frame)
2d Front end (of side wall)
2e Rear end (of side wall)
3 First hinge
4 Protective cover
5 Support base
6 Mast 7 Lever arm
7a Distal end (of lever arm)
8 First bracket
9 Second bracket
10 Back panel (of upper frame)
11 Solar panel
12 Louvres
13 Front panel (of lower frame)
14 Dividing wall
15 First gap
16 First tension springs
17 Outer flap
18 Back panel (of lower frame)
19 Second dividing wall
20 Second gap
21 Second tension springs
22 Inner flap
23a Second hinge
23b Third hinge
24 Air vent
24a Hinge (of air vent)
25 Bimetallic thermal torsion spring
26 Bracket assembly
26a Upper arm (of bracket assembly)
26b Vertical arm (of bracket assembly)
26c Connecting arm (of bracket assembly)
27 Air vent spring
28 Block

DETAILED DESCRIPTION OF INVENTION

FIG. 1 is a front perspective view of the present invention shown in a first position. As shown in this figure, the present invention comprises an upper frame 1 and a lower frame, the upper and lower frames being pivotally connected to each other on their from surfaces (at the bottom of the front surface of the upper frame and the top of the front surface of the lower frame) via a first hinge 3. In a preferred embodiment, each of the upper and lower frames 1, 2 is rectangular (the term "rectangular," as used herein, including, but not limited to, "square") in shape. The first hinge 3 preferably extends across the entire width of the bottom end of the front surface of the upper frame and the entire width of the top end of the front surface of the lower frame.

Figure 2:
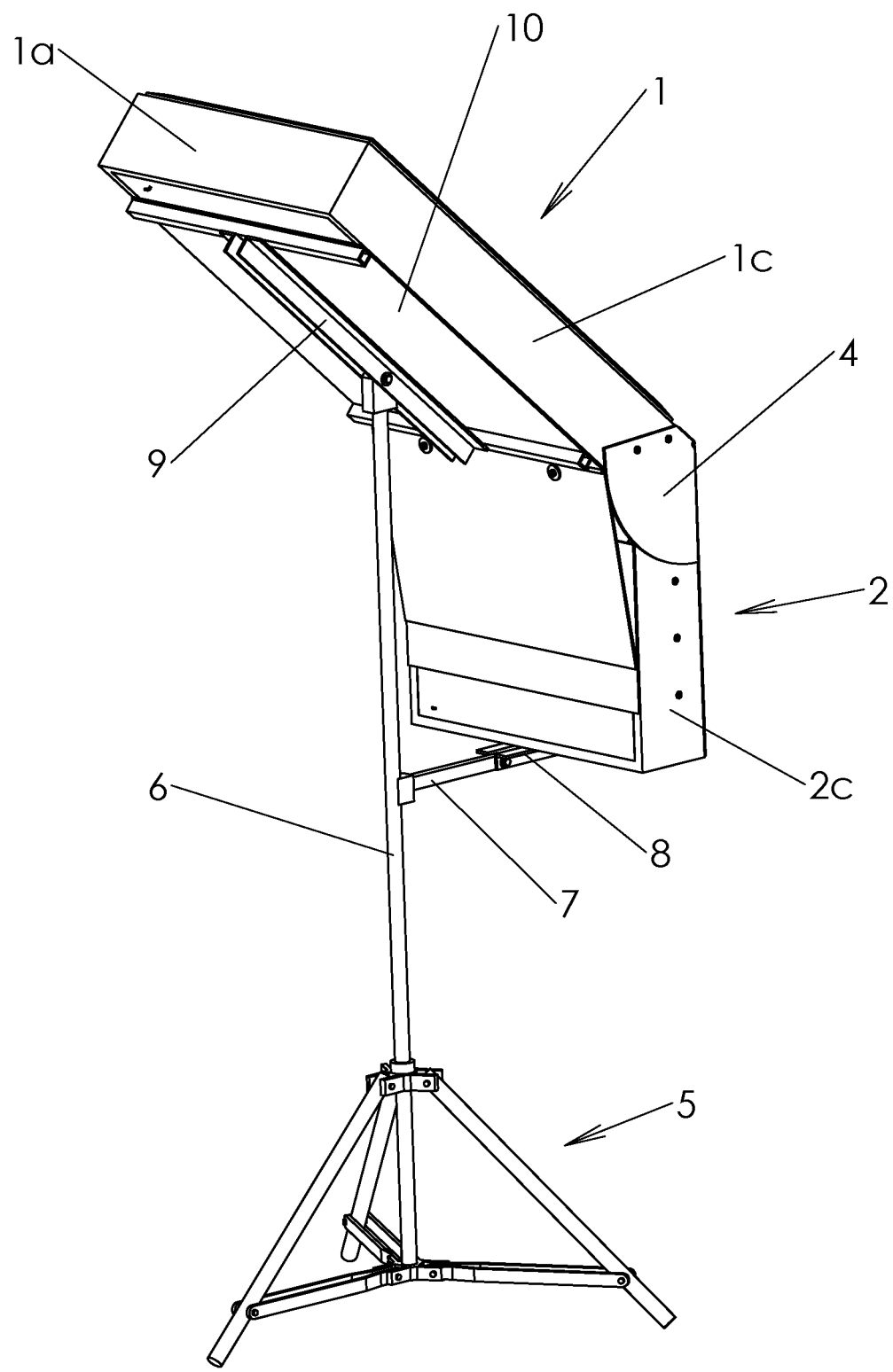
FIG. 2 is a rear perspective view of the present invention shown in a first position.
Figure 3:
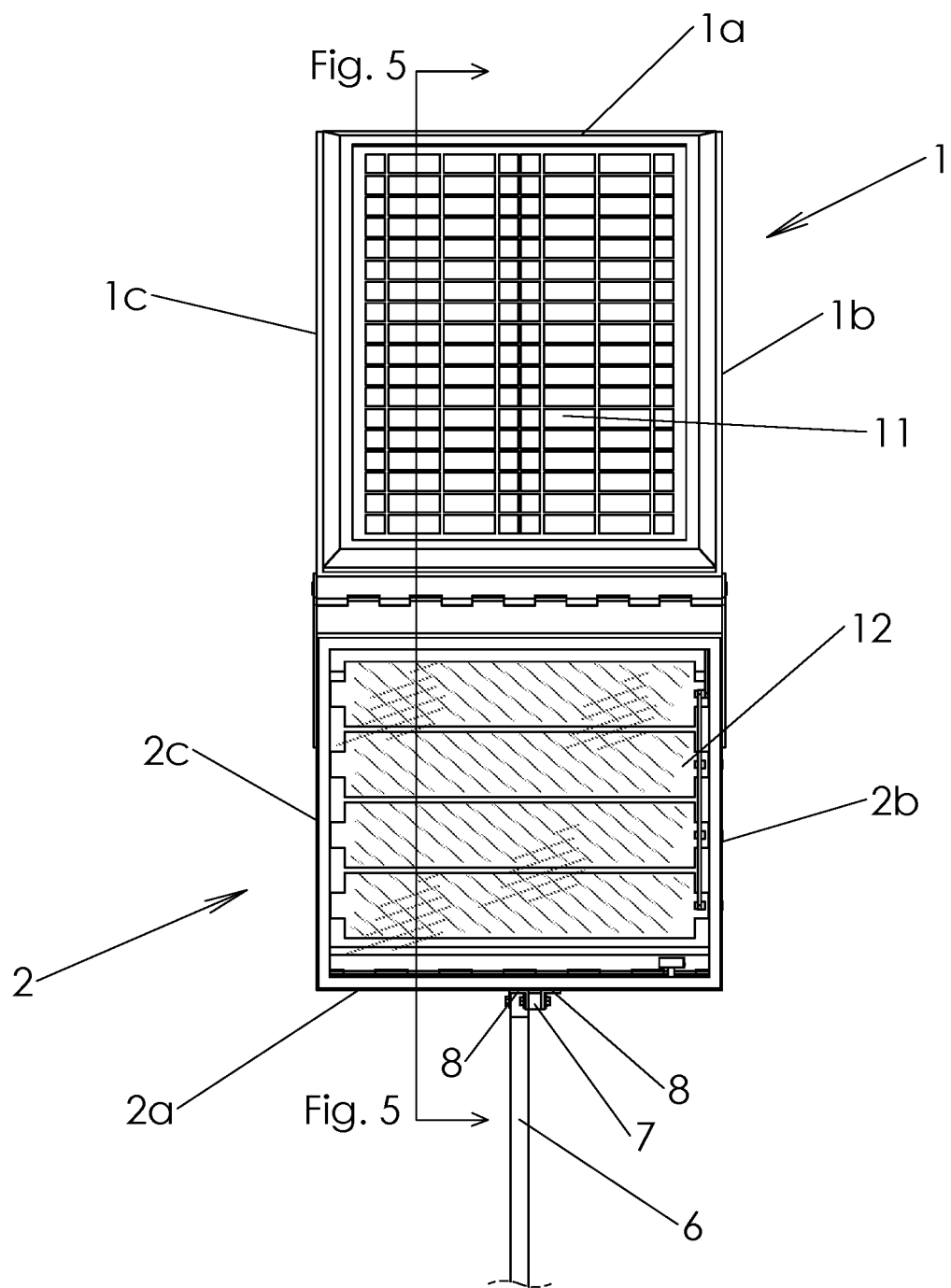
FIG. 3 is a front view of the present invention shown in a first position.

The upper frame 1 is comprised of a top wall 1a, a first side wall 1b, and a second side wall 1c (see also FIGS. 2 and 3). Each end (right and left) of the top wall 1a is attached to the top ends of the side walls 1b, 1c, as shown, to form a box shape with an open bottom. In this manner, the upper frame forms a first interior cavity, which is discussed more fully below. The lower frame 2 is comprised of a bottom wall 2a, a first side wall 2b and a second side wall 2c. Each end (right and left) of the bottom wall 2a is attached to the bottom ends of the side walls 2b, 2c, as shown, to form a box shape with an open top. In this manner, the lower frame forms a second interior cavity, which is discussed more fully below.

Figure 16:
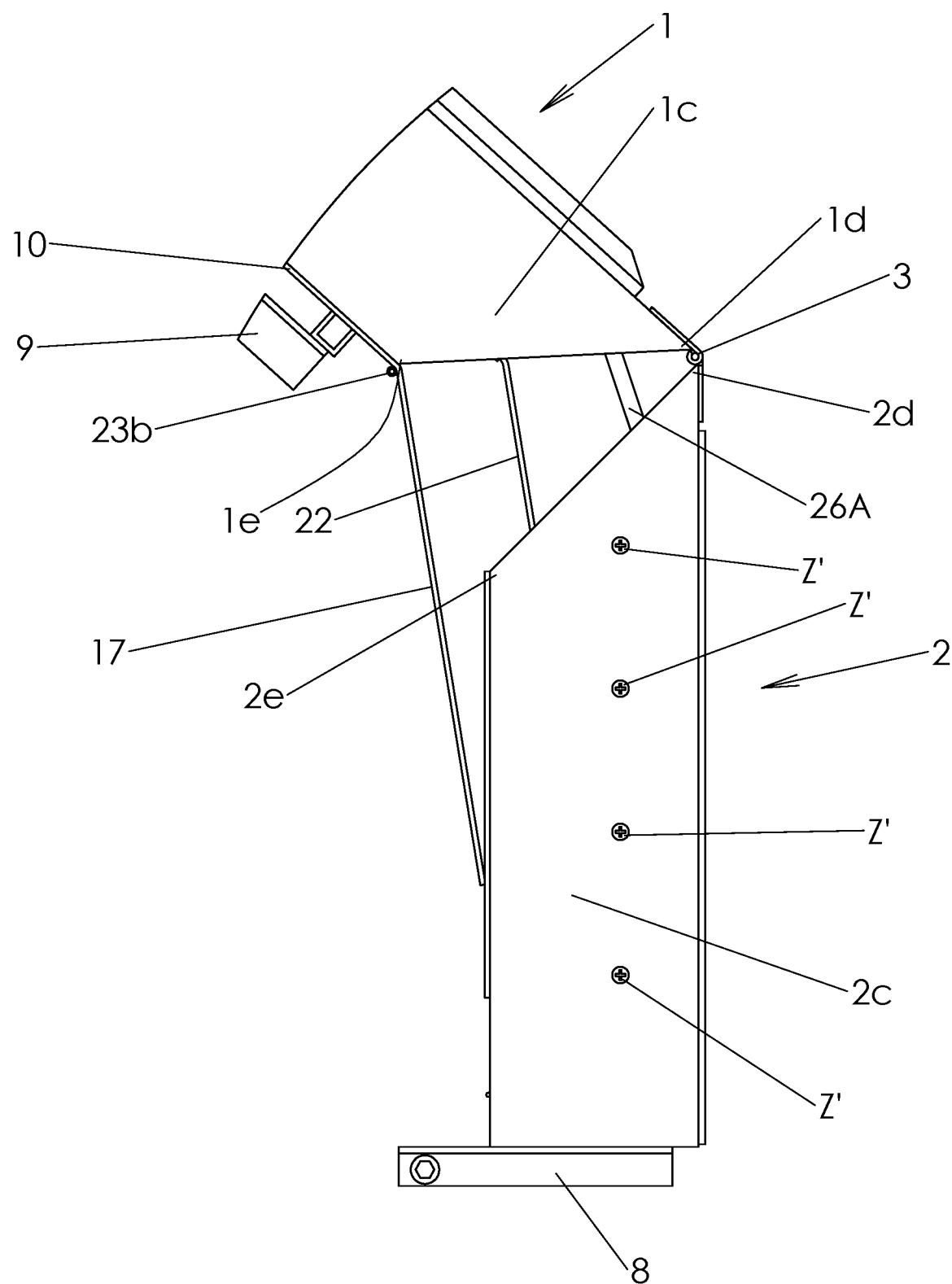
FIG. 16 is a detail side view of the present invention taken at the circle shown in FIG. 4.

As shown in FIG. 16, the bottom end of each of the side walls 1b, 1c of the upper frame is cut at an angle such that the front end (or tip) 1d of the side wall is longer than the rear end (or tip) 1e of the side wall. The top end of each of the side walls 2b, 2c of the lower frame is cut at an angle such that the front end (or tip) 2d of the side wall is longer than the rear end (or tip) 2e of the side wall. See FIGS. 5, 10 and 11. The tapered ends of the side walls 1b, 1c and 2b, 2c enable the upper and lower frames 1, 2 to pivot toward each other, as discussed more fully below. Please note that the protective cover 4 and lever arm 7 have been omitted from FIG. 16 for clarity.

Referring back to FIG. 1, in a preferred embodiment a first protective cover 4 is connected to the bottom end of side wall 1b and the top part of the side wall 2b, and a second protective cover 4 is connected to the bottom end of side wall 1c and the top part of the side wall 2c. The purpose of the protective cover 4 is to prevent dirt, debris and precipitation from entering the first or second interior cavities. The protective cover 4 may be made of any suitable rigid or non-rigid (flexible) material, such as plastic or canvas. If the protective cover 4 is made of a rigid material, then it must be configured in a manner that allows the upper frame 1 to rotate relative to the lower frame 2.

FIG. 2 is a rear perspective view of the present invention shown in a first position. As shown in this figure, the present invention further comprises a support base 5, a mast 6, a lever arm 7, a first bracket 8, and a second bracket 9. The support base 5 may take the form of a tripod or any other structure that secures the mast in an upright position. The mast 6 may take the form of a pole or any other vertical support member. The lever arm 7 is pivotally attached to a mid-section of the mast, and it is also pivotally attached (at a distal end 7a of the lever arm 7) to a bottom part of the lower frame 2 via the first bracket 8. The top end 6a of the mast 6 is pivotally attached to the second bracket 8, which is configured to support a back panel 10 of the upper frame. The back panel 10 defines the rear wall of the first interior cavity.

FIG. 3 is a from view of the present invention shown in a first position. As shown in this figure a solar panel 11 comprised of a plurality of photovoltaic cells us positioned within or affixed to the front part of the upper frame 1. Situated inside the second interior cavity is a plurality of louvres 12. Each louvre is preferably black (or a similar heat-absorbing color) on its front surface (shown in FIG. 3) and white (or a similar heat-reflecting color) on its rear surface. The lower frame 2 is comprised of a transparent or translucent front panel 13 (see FIG. 5), which allows solar rays to penetrate the front panel 13 and hit the louvres 12.

Figure 4:
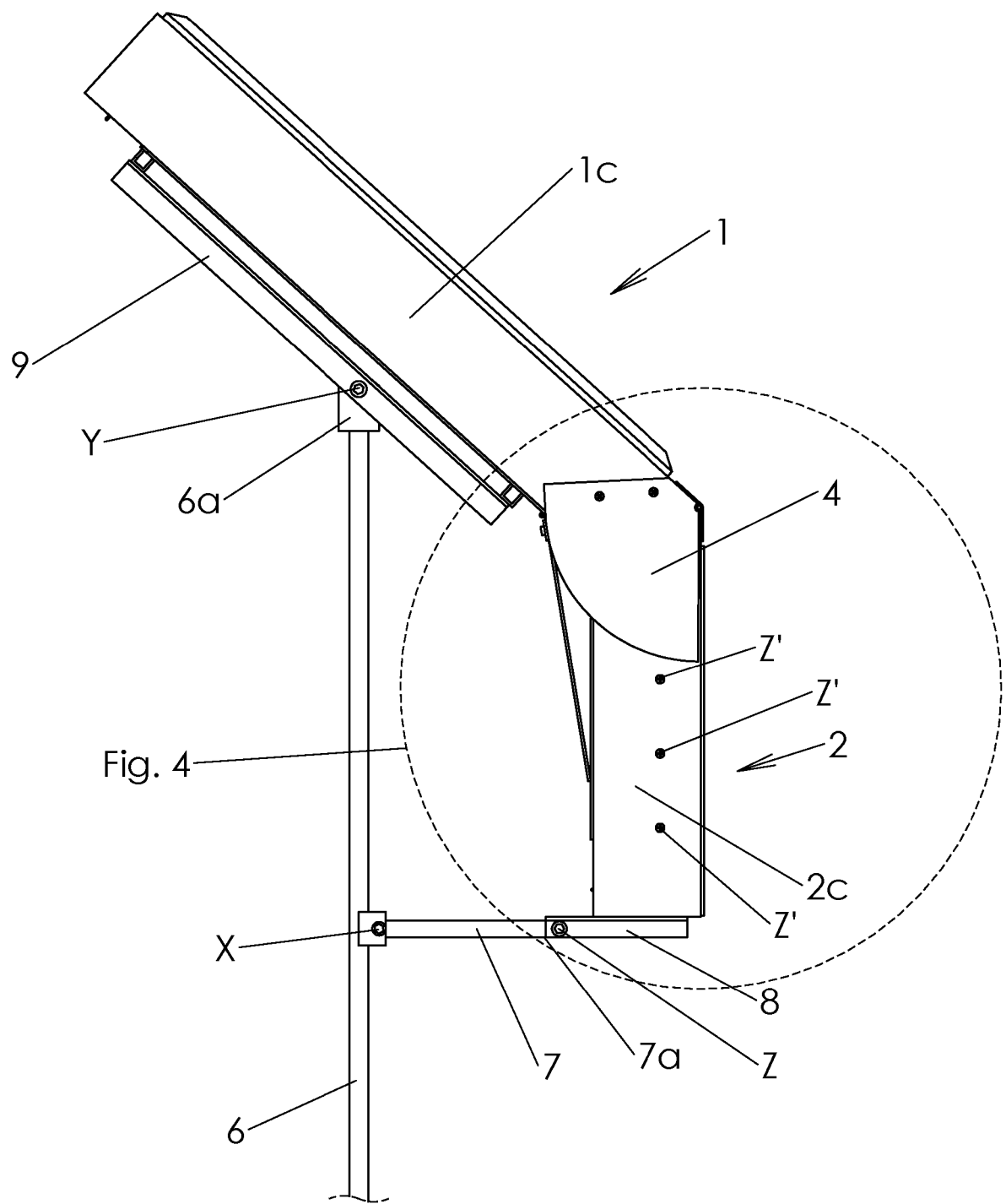
FIG. 4 is a side view of the present invention shown in a first position.

FIG. 4 is a side view of the present invention shown in a first position. This figure shows the distal end 7a of the lever arm 7 attached to the first bracket 8. It also shows the top end 6a of the mast 6, which is pivotally attached (Y) to the back of the upper frame 1 via the second bracket 9. FIG. 4 also shows the louvre pivots points, which are demarcated as Z' in the figures. Each louvre pivots about a horizontal axis, as shown, and the individual louvres 12 are preferably stacked on top of one another in a vertical configuration.

Figure 5:
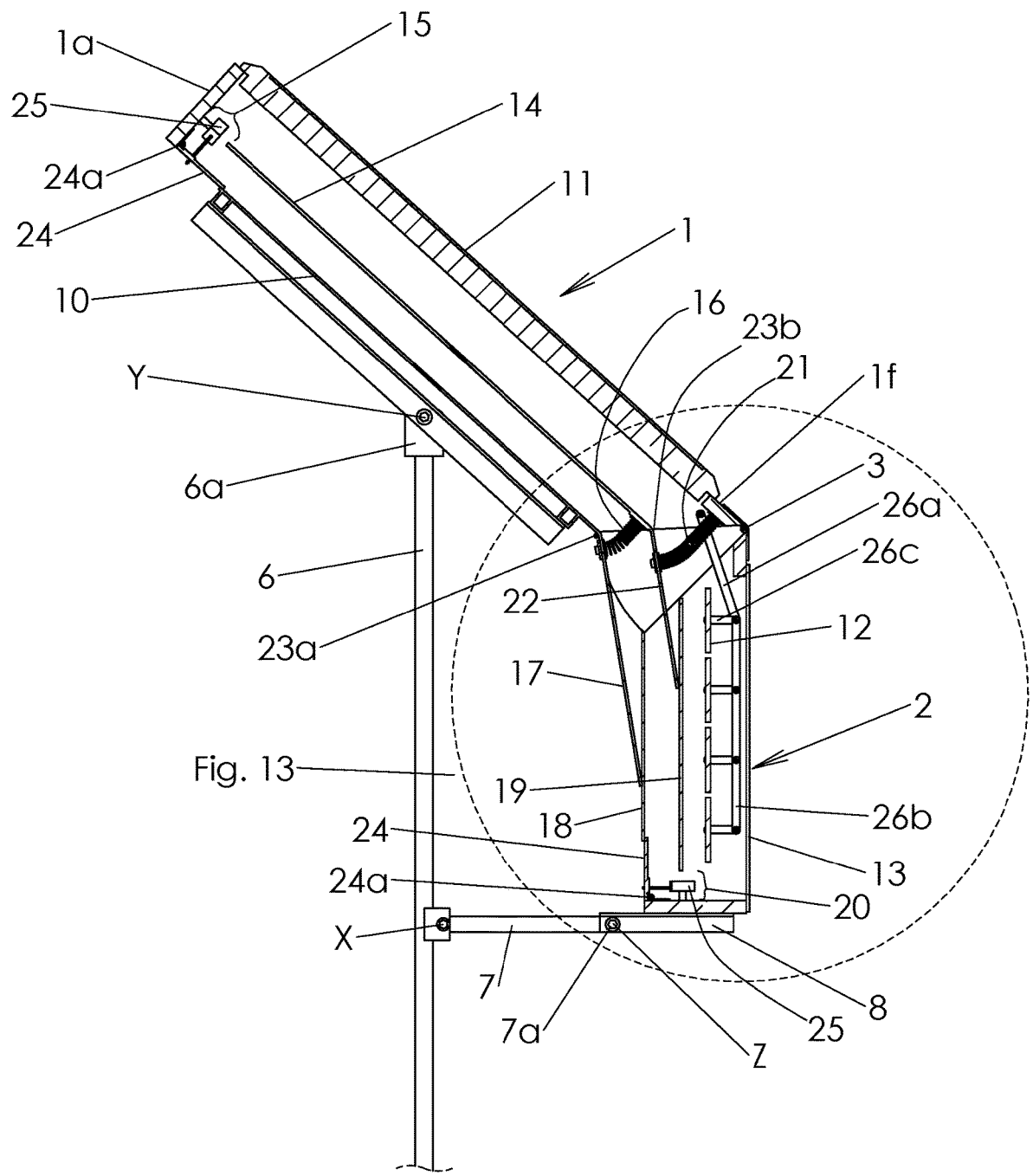
FIG. 5 is a section view of the present invention taken at the line shown in FIG. 3.
Figure 17:
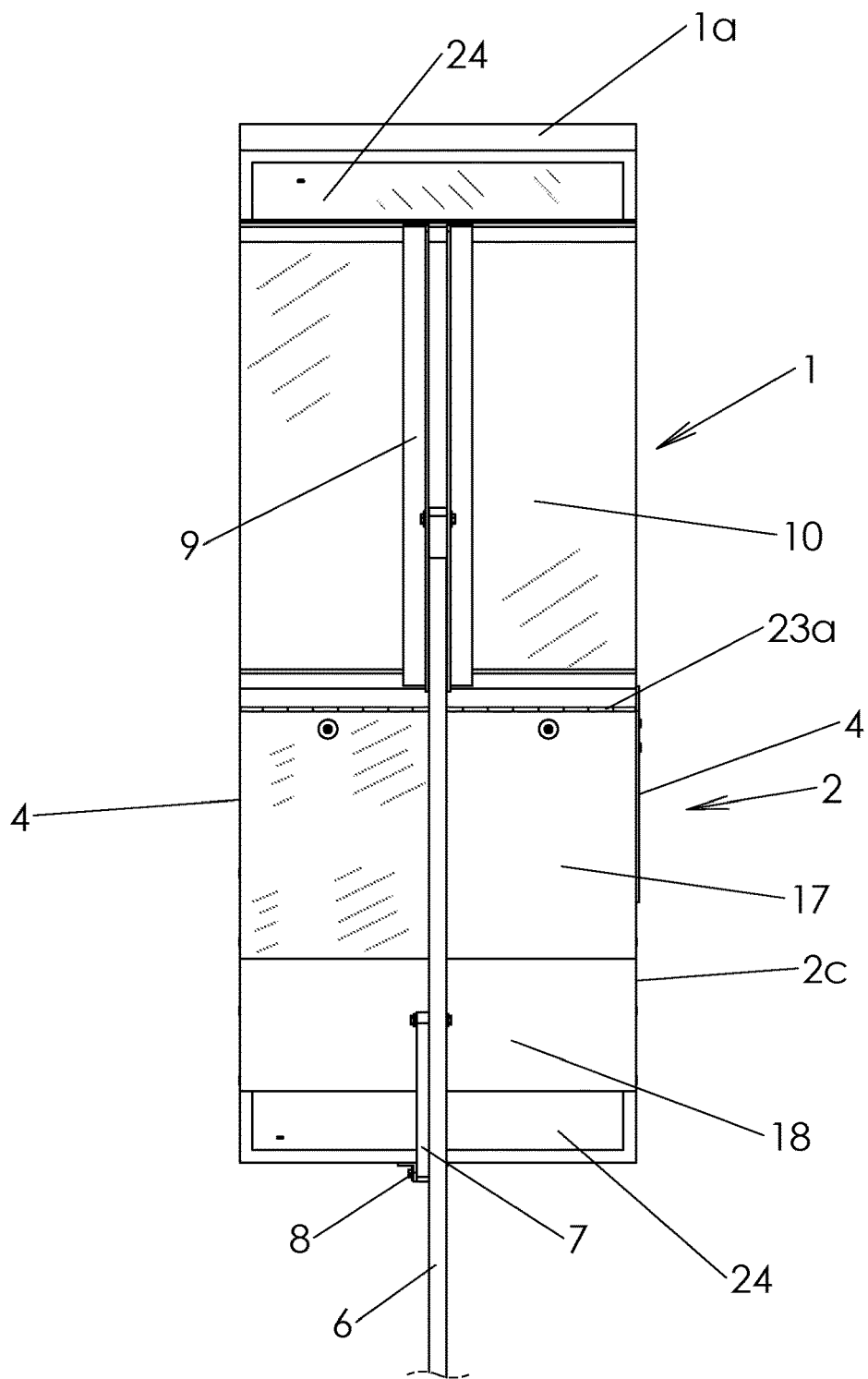
FIG. 17 is a back view of the present invention shown in a first position.

FIG. 5 is a section view of the present invention taken at the line shown in FIG. 3. As shown in this figure, a first dividing wall 14 is situated within the upper frame 1 and in between the solar panel 11 and back panel 10. The first dividing wall 14 covers the entire interior width (right to left) of the first interior cavity and extends from a point that is midway between the front and rear ends 1d, 1e of the first and second side walls 1b, 1c at the bottom of the first dividing wall 14 to a point short of the top wall 1a of the upper frame 1 (see also FIG. 16). In this configuration, there is a first gap 15 between the top edge of the first dividing wall 14 and the inner surface of the top wall 1a. Two first tension springs 16 are attached at one end of each spring to the bottom part of the first dividing wall 14 and on the other end of each spring to an outer flap 17. The top pan of the outer flap 17 is attached to the bottom edge of the back panel 10 via a second hinge 23a (see also FIGS. 7, 12 and 17). The springs are configured to pull the outer flap 17 into a closed position against the back of the back panel 10, as shown, to maintain a closed system when heat is needed. In a preferred embodiment, the outer flap 17 is flat and its length is configured so that when the invention is in the third position (see FIG. 18), the outer flap 17 does not cover the air vent 24.

As discussed more fully below in connection with FIGS. 13 and 14, the louvres 12 are maneuverable between a first position and a second position via a bracket assembly 26. The lower frame 2 further comprises a back panel 18 that covers the entire rear surface of the lower frame 2. A second dividing wall 19 is situated in between the front panel 13 and the back panel 18. The second dividing wall 19 covers the entire interior width (right to left) of the second interior cavity and extends from a point that is between the front and rear ends 2d, 2e of the first and second side walls 2b, 2c to a point short of the bottom wall 2a. In this configuration, there is a second gap 20 between the bottom edge the second dividing wall 19 and the inner surface of the bottom wall 2a. Two second tension springs 21 are attached at one end of each spring to the top part of an inner flap 22 and on the other end of each spring to a bottom part 1f of the upper frame 1 (see FIG. 5). The top part of the inner flap 22 is attached to the bottom edge of the first dividing wall 14 via a third hinge 23b. The springs are configured to pull the inner flap 22 into a closed position against the back of the second dividing wall 19, as shown.

Figure 13:
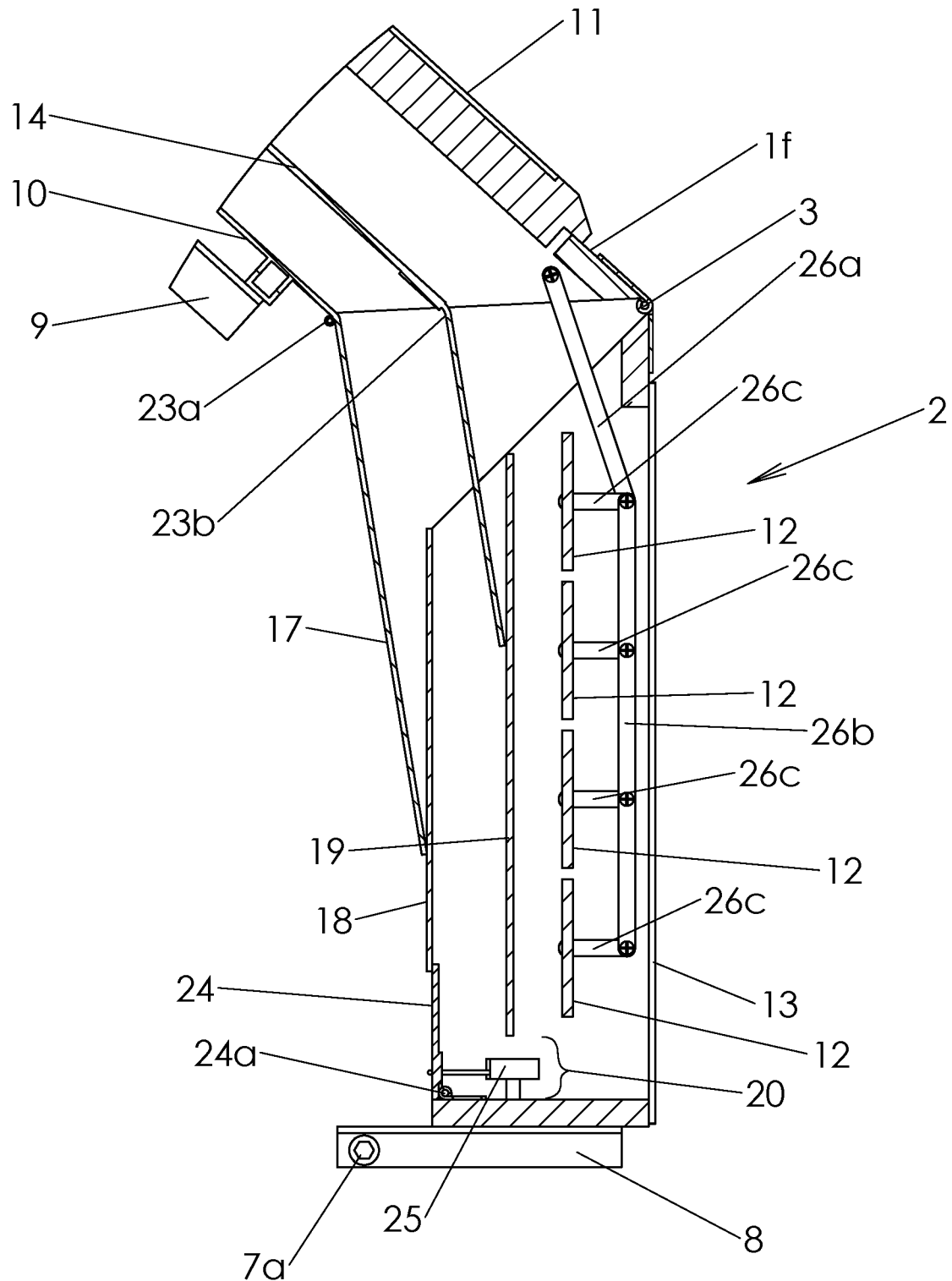
FIG. 13 is a detail section view of the bracket assembly taken at the circle shown in FIG. 5 with the louvres in a first position.
Figure 14:
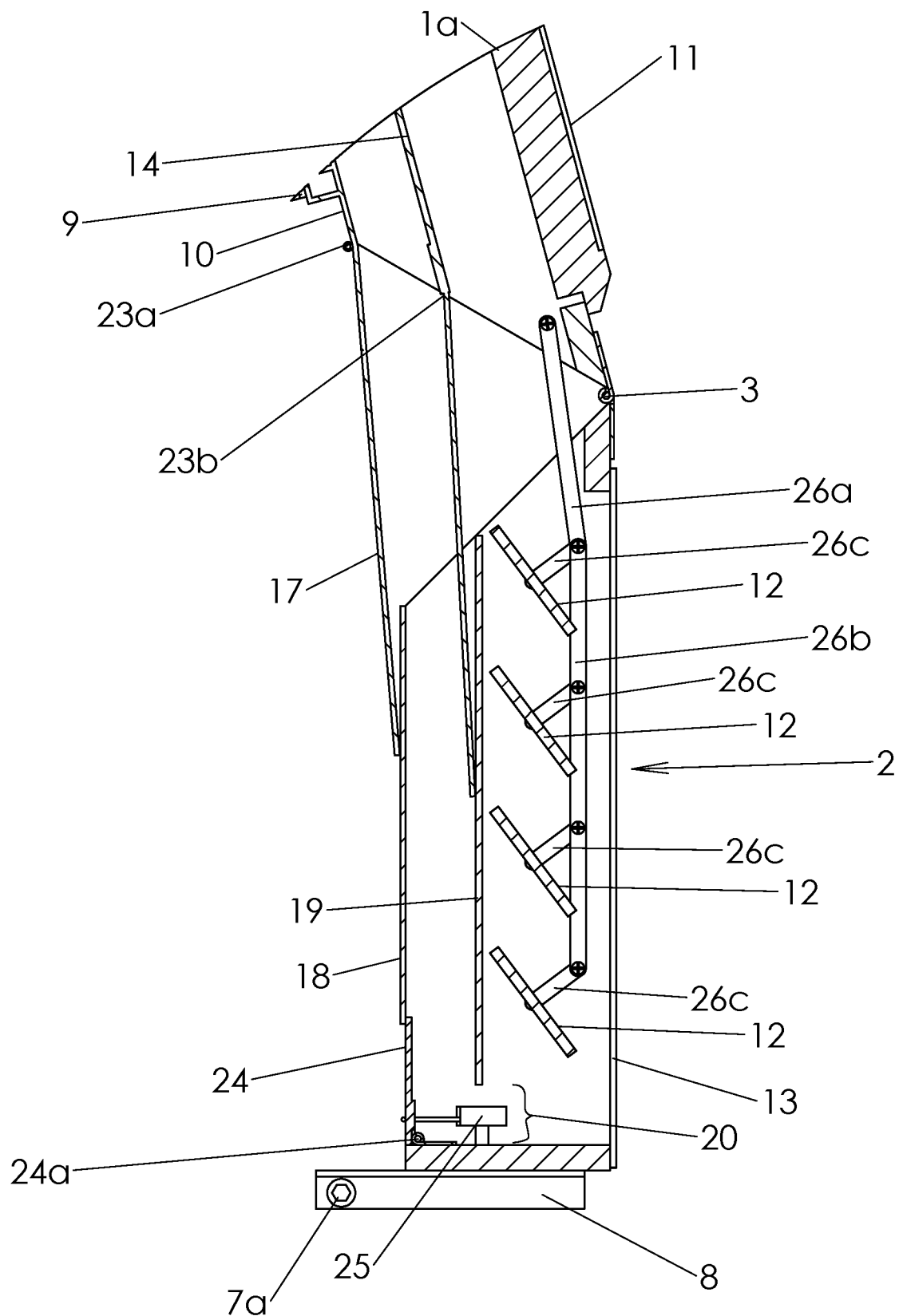
FIG. 14 is a detail section view of the bracket assembly taken at the circle shown in FIG. 10 with the louvres in a second position.

As shown in FIGS. 13 and 14, the bracket assembly 26 is comprised of an upper arm 26a, a vertical arm 26b, and a plurality of connecting arms 26c. The number of connecting arms 26c corresponds to the number of louvres 12. The upper arm 26a is connected at one end to the bottom end of the upper frame 1 and at the other end to the top end of the vertical arm 26b. The vertical arm 26b is secured to the lower frame 2. Each of the connecting arms 26c is attached at one end to the vertical arm 26b and at the other end to a louvre 12. The entire bracket assembly 26 is preferably contained within the lower frame 2, with the exception of the top part of the upper arm 26a, which extends toward and is connected to the bottom end of the upper frame 1, as stated above. The present invention is not limited to any particular configuration of the bracket assembly 26 as long as it is configured to cause the louvres 12 to open perpendicular to incoming sunlight when the upper frame is rotated into the position shown in FIG. 14 and to be parallel to incoming sunlight when the upper frame is rotated into the position shown in FIG. 13. The rotation of the invention may be effectuated manually or automatically via an actuator (not shown). Please note that the protective cover 4, mast 6, lever arm 7 and springs 16, 21 have been omitted from FIGS. 13 and 14 for clarity.

Figure 6:
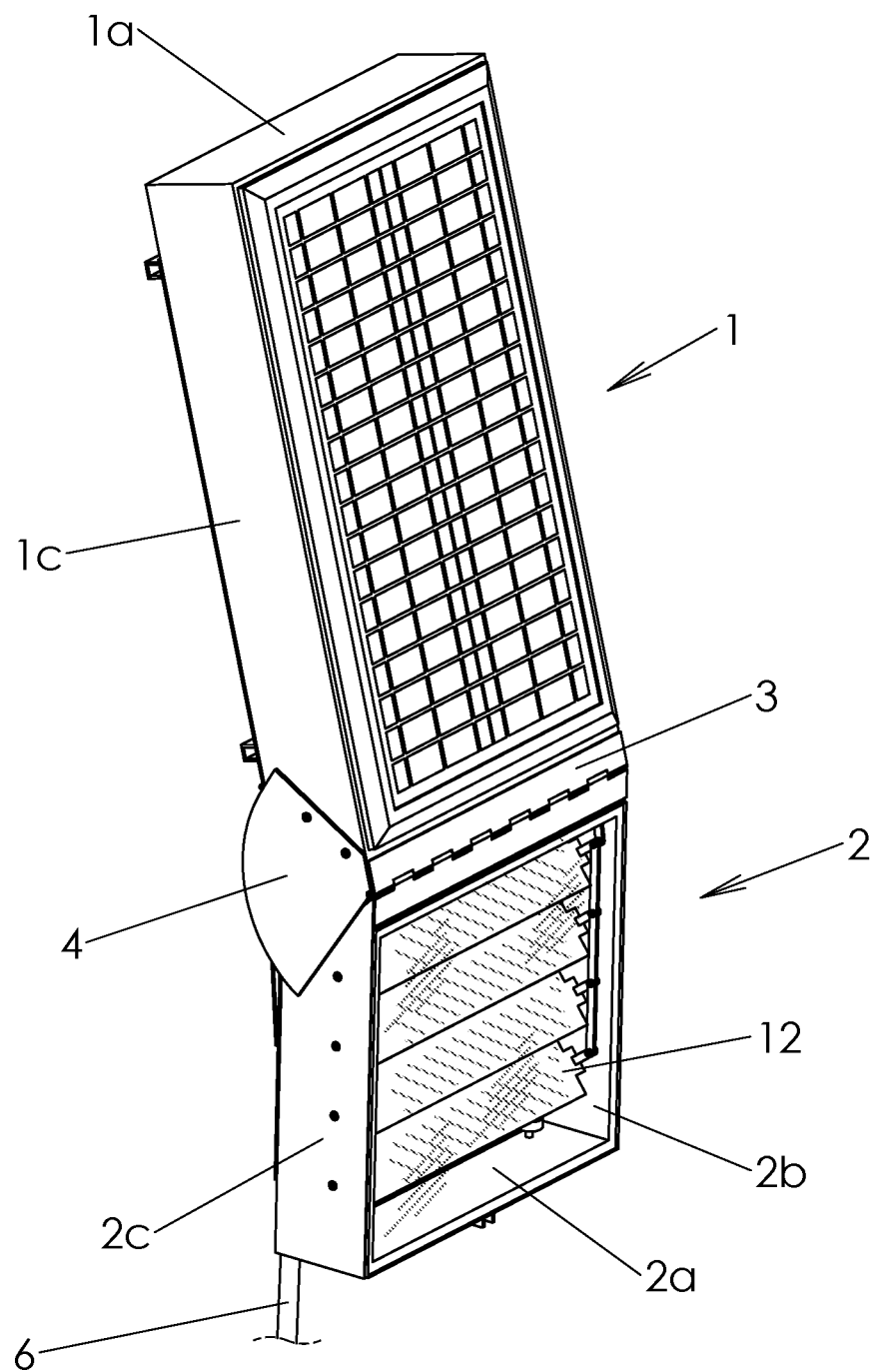
FIG. 6 is a front perspective view of the present invention shown in a second position.

FIG. 6 is a front perspective view of the present invention shown in a second position. In this figure, the upper and lower frames 1, 2 have been rotated at pivot points "X," "Y" and "Z" (see FIG. 4) until the lower frame 2 is in a vertical or near-vertical position, as shown, and the solar panel 11 is facing more straight forward than upward (as in FIG. 1). Preferably, the solar panel 11 is at an angle perpendicular to the sun's rays at noon on that day, if the panel is automated, or on the winter solstice if the panel's position is fixed. As the invention is shifted into this position, the bracket assembly 26 causes the louvres 12 to rotate from the position shown in FIG. 13 to the position shown in FIG. 14, in which the louvres 12 are perpendicular to incoming solar radiation (that is, they no longer present their edges to the sun as shown in FIG. 1). In the latter position, the black faces of the louvres 12 are in an ideal position for capturing the sun's rays during the colder times of the year, and the solar panel 11 is in a position in which melted snow and ice can easily run off of the panel (by gravity) rather than creating pools on the surface of the solar panel 11.

Figure 7:
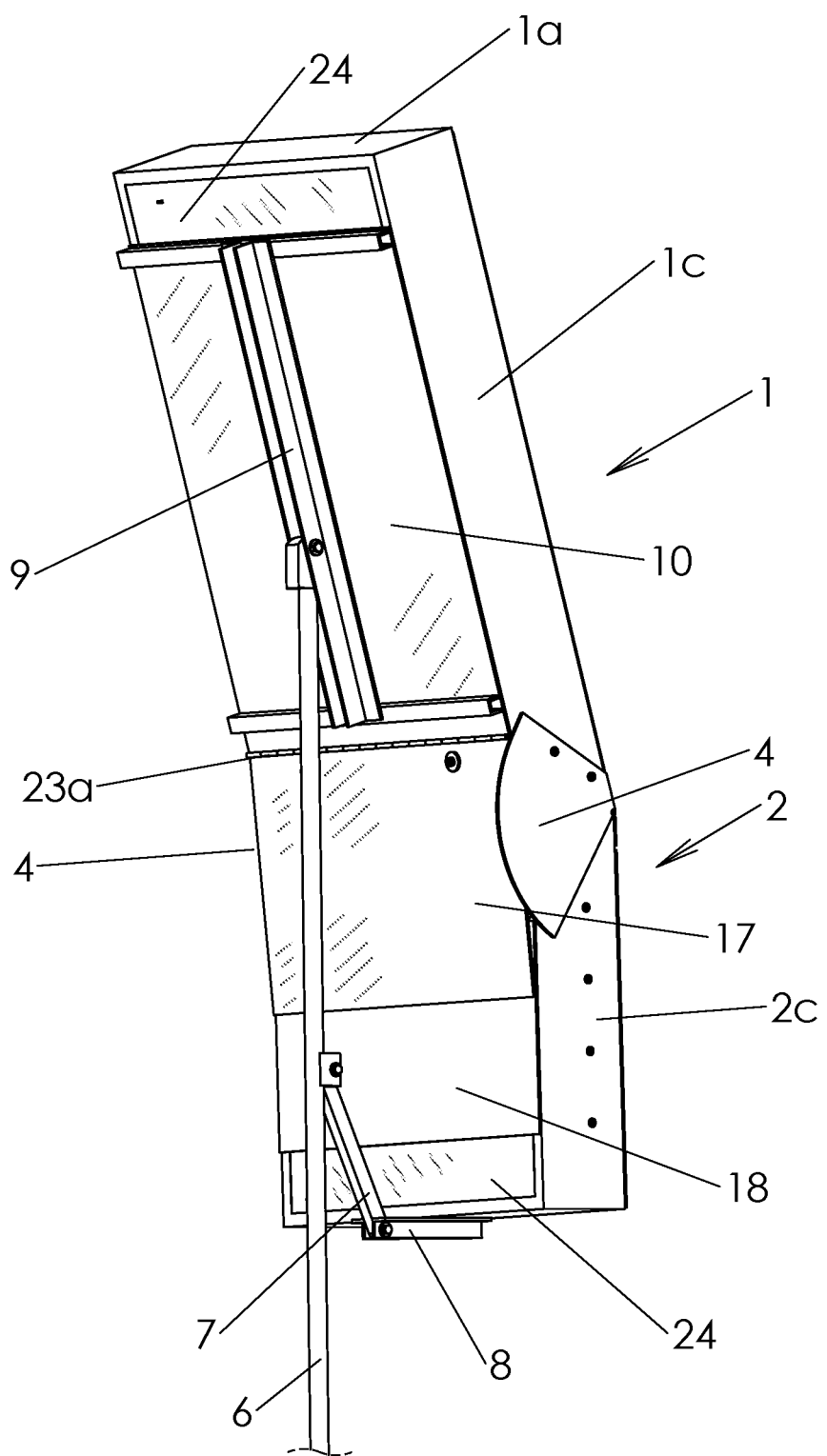
FIG. 7 is a rear perspective view of the present invention shown in a second position and with the air vents in a closed position.
Figure 15:
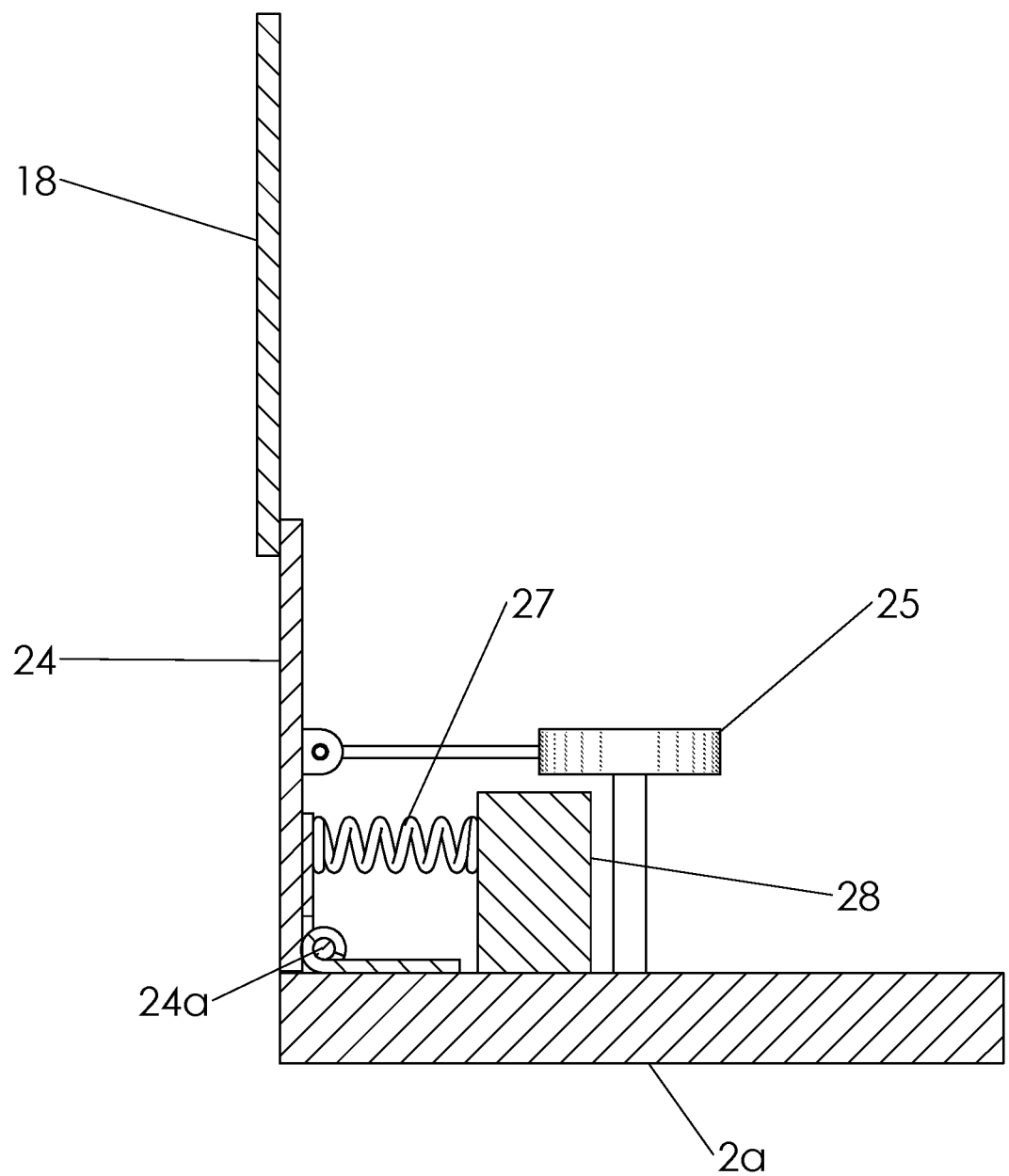
FIG. 15 is a detail section view of the air vent and air vent spring.

FIG. 7 is a rear perspective view of the present invention shown in a second position and with the air vents in a closed position. As shown in this figure, each of the back panels 10, 18 comprises an air vent 24. Each of the air vents 24 is connected to a bimetallic thermal torsion spring 25 (see FIG. 15), which is configured to open the air vent 24 as the spring warms up due to its exposure to warm air captured inside of the first and second interior cavities. Each of the air vents 24 is comprised of a flap connected to an air vent hinge 24a, which in turn is connected to the rear of the top wall 1a of the upper frame 1 or the rear of the bottom wall 2a of the lower frame 2. An air vent spring 27, which in this embodiment is supported by a block 28, biases the air vent 24 into a closed position, as shown. Thus, the bimetallic thermal torsion spring 25 serves to open the air vent to cool the interior cavities, and the air vent spring 27 counteracts that force. In lieu of the bimetallic thermal torsion springs, low-power electronic actuators may be used to control the air vents 24.

Figure 8:
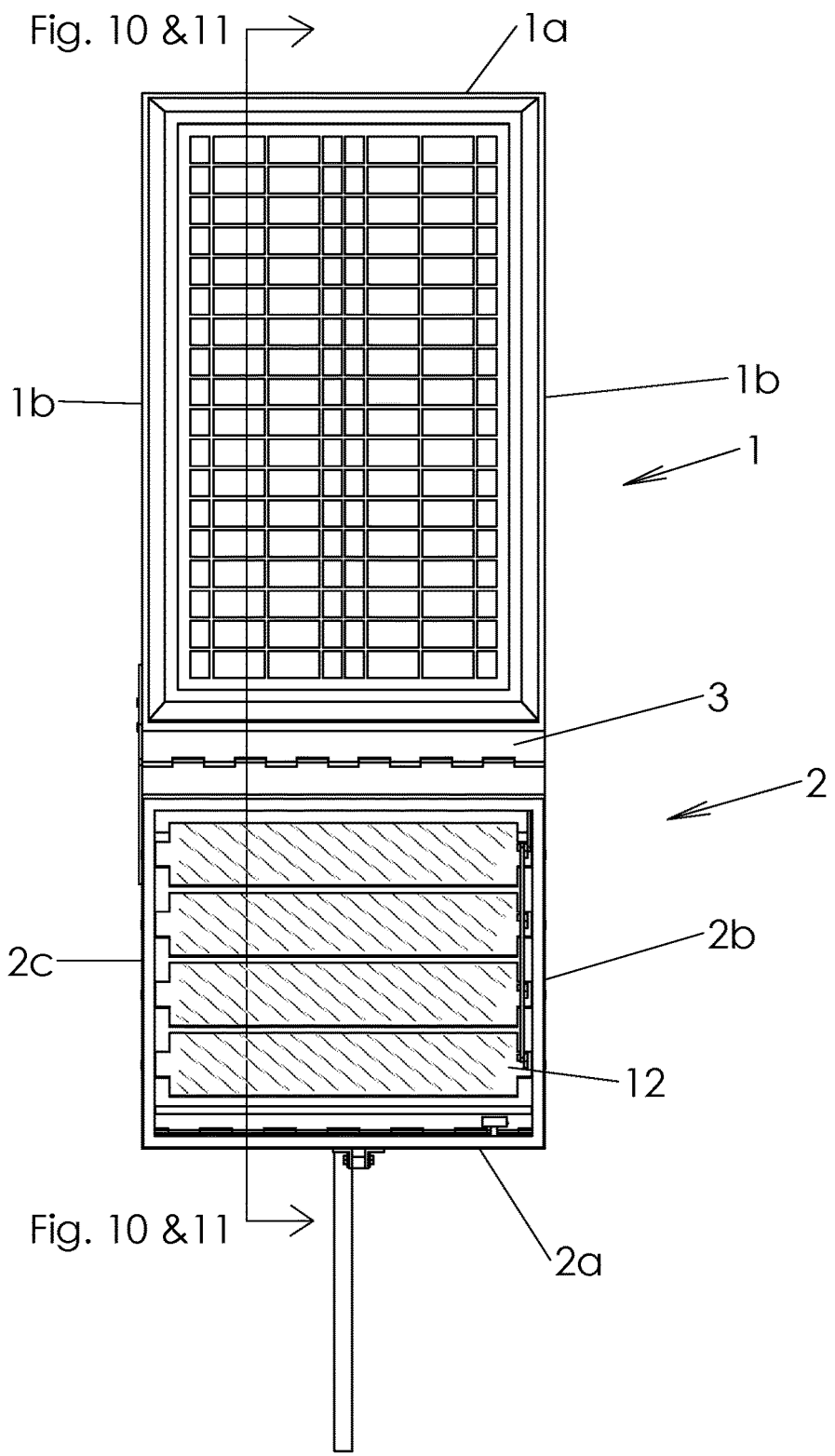
FIG. 8 is a from view of the present invention shown in a second position.

FIG. 8 is a front view of the present invention shown in a second position. This figure shows the gaps between the individual louvres 12, which are preferably at an angle matching that of the solar panel. The present invention is not limited to any particular angle of the louvres as the preferred angle will change depending on the latitude and season.

Figure 9:
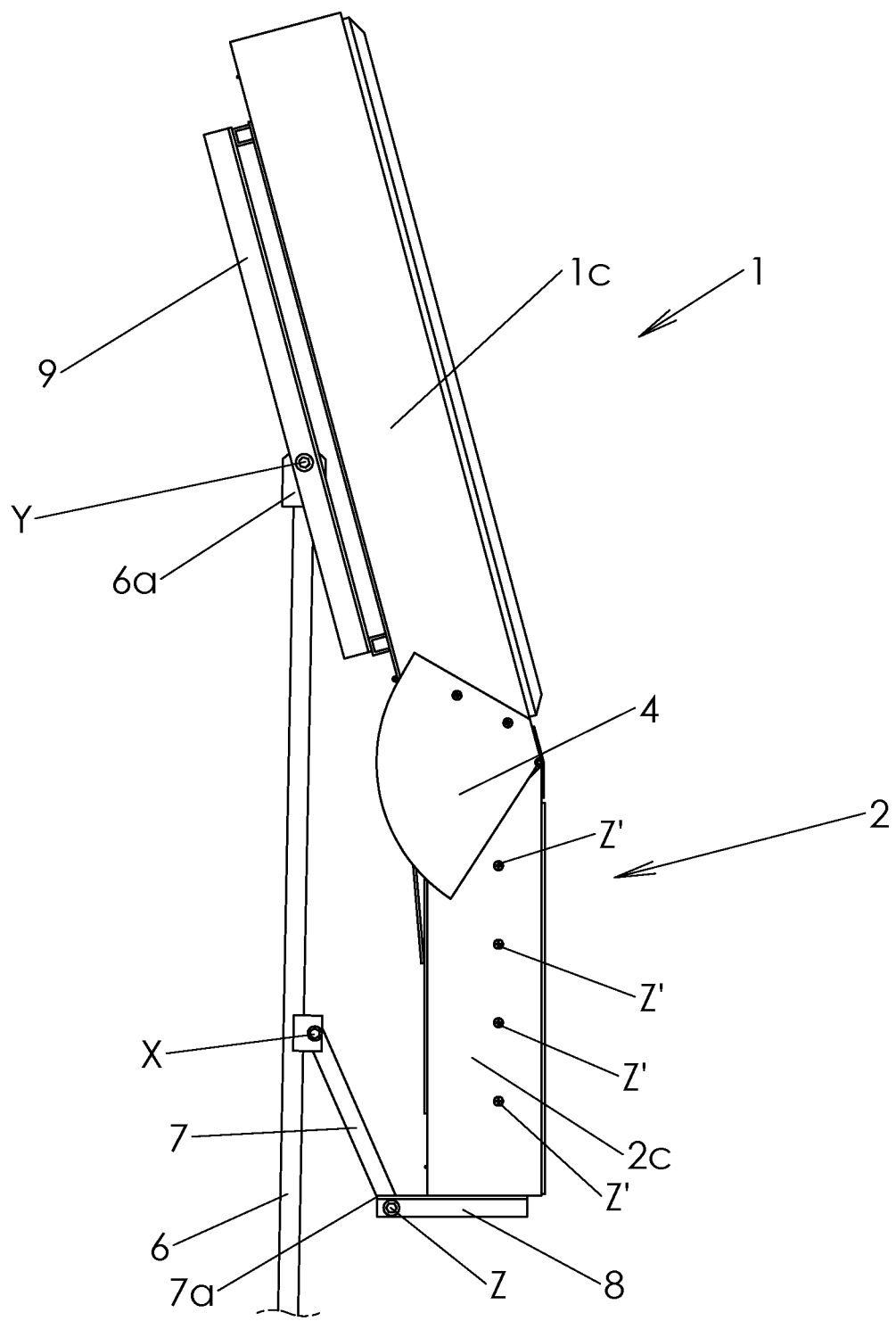
FIG. 9 is a side view of the present invention shown in a second position.

FIG. 9 is a side view of the present invention shown in a second position. Note that as the invention rotates into this position, the apparatus pivots at points X, Y and Z (compare to FIG. 4).

Figure 10:
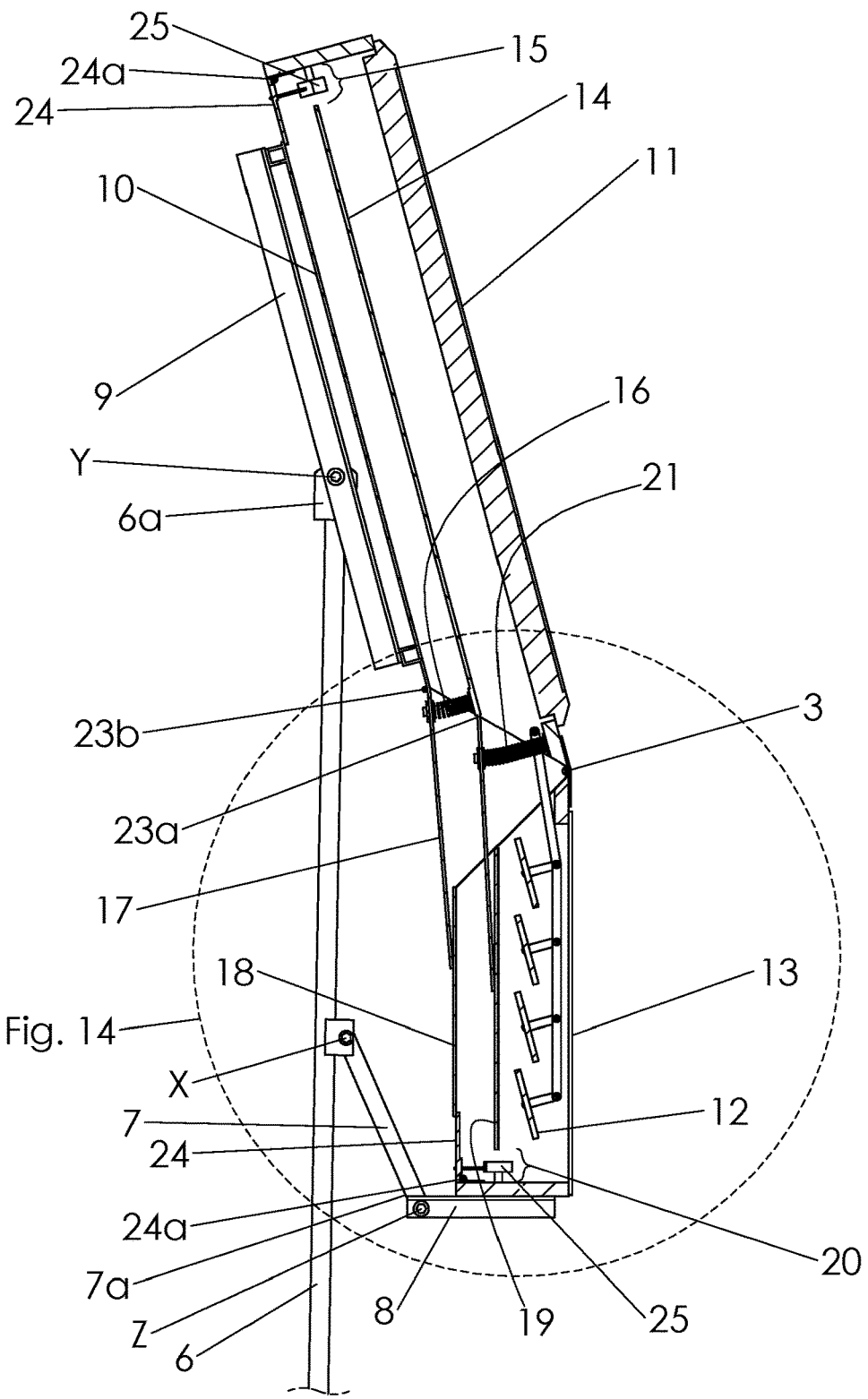
FIG. 10 is a section view of the present invention taken at the line shown in FIG. 8 and shown with the air vents in a closed position.

FIG. 10 is a section view of the present invention taken at the line shown in FIG. 8 and shown with the air vents in a closed position. As shown in this figure, the bimetallic thermal torsion springs 25 are positioned within the first and second gaps 15, 20.

Figure 11:
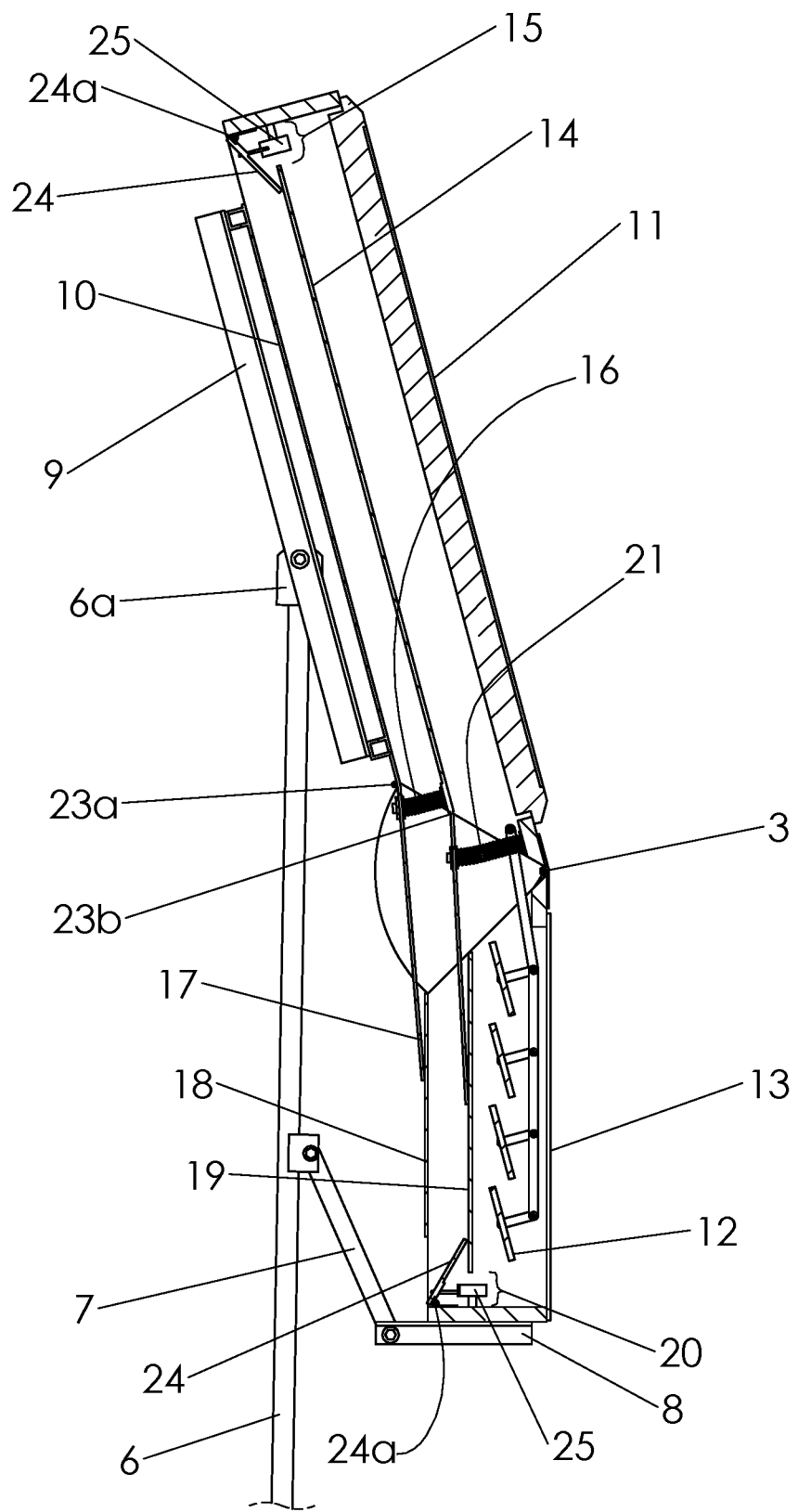
FIG. 11 is a section view of the present invention taken at the line shown in FIG. 8 and shown with the air vents in an open position.
Figure 12:
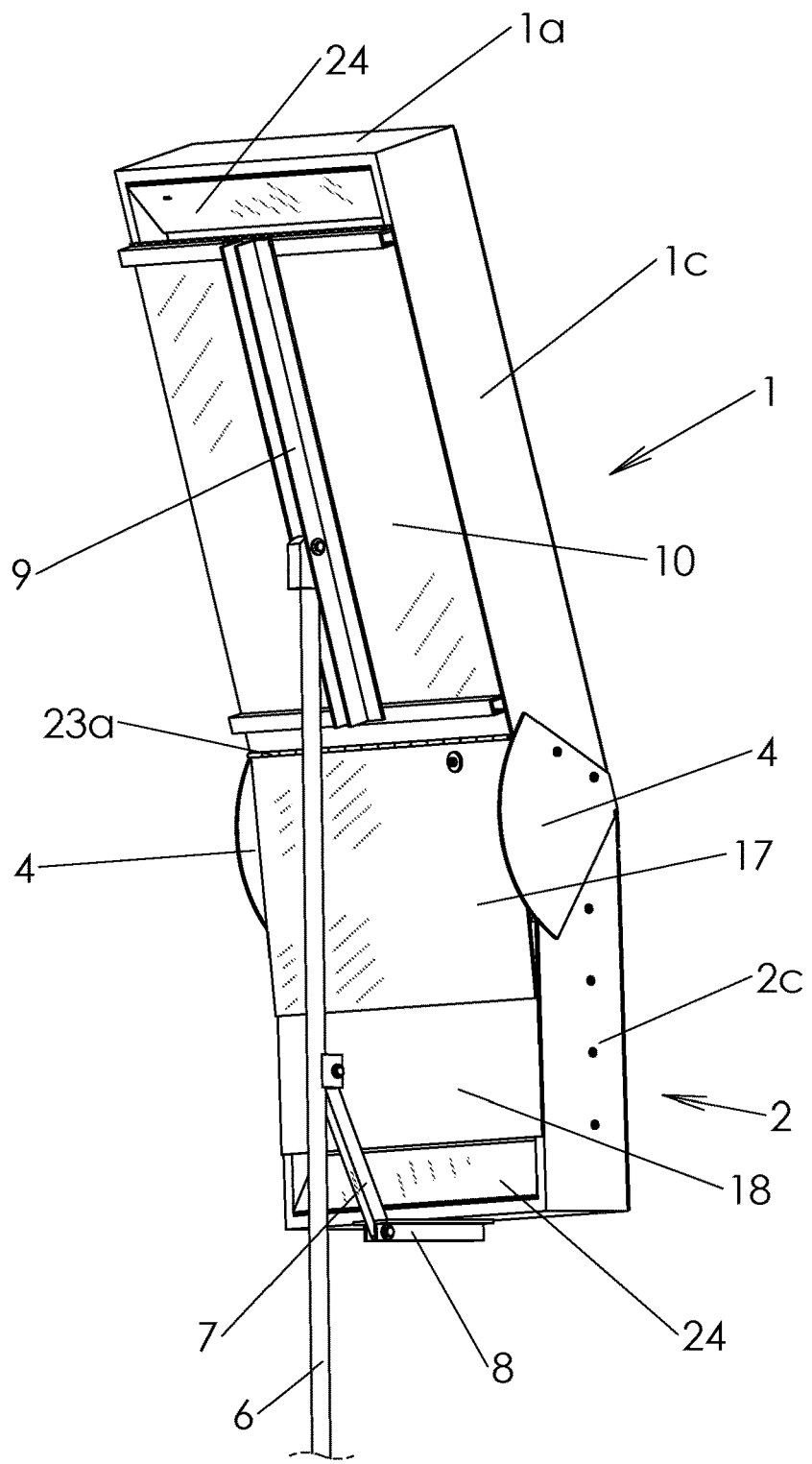
FIG. 12 is a rear perspective view of the present invention shown in a second position and with the air vents in an open position.

FIG. 11 is a section view of the present invention taken at the line shown in FIG. 8 and shown with the air vents 24 in an open position, and FIG. 12 is a rear perspective view of the present invention shown in a second position and with the air vents in an open position.

Figure 18:
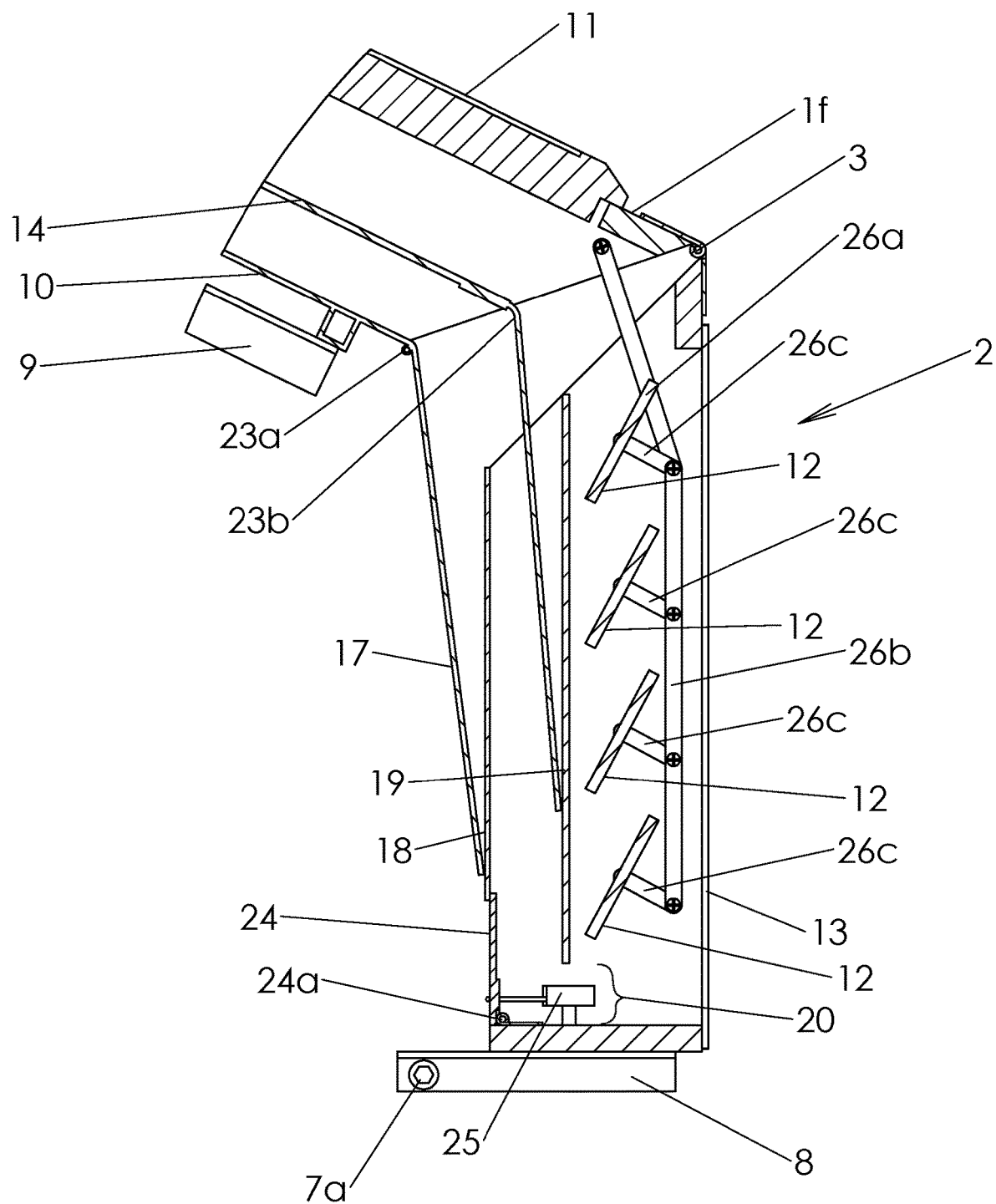
FIG. 18 is a detail section view of the bracket assembly shown in a third position.

FIG. 18 shows the invention in a third position, in which the upper frame 1 has been rotated as far as possible relative to the lower frame 2. This is the position in which the invention would most likely be used during the summer months when the sun is higher in the sky than it is in the winter. What is referred to herein as the "second position" is the position in which the invention would most likely be used during the winter months when the sun is relatively lower in the sky. What is referred to herein as the "first position" is the position in which the invention might be used during the shoulder seasons of spring and fall. An advantage of the present invention is that the relative positions of the upper and lower frames may be rotated to any angle between one hundred eighty degrees (which would mean that the upper and lower frames are vertically aligned) to ninety degrees (which would mean that the lower frame is oriented perpendicularly to the upper frame).

The configuration of the present invention creates a thermosiphon, or a method of passive heat exchange, by which warm air rises in the front part of the upper frame 2 behind the solar panels 11 to the top of the upper frame 2, where it passes from the front to the rear of the upper frame via the first gap 15. As the air behind the dividing wall 14 cools, it pulls the warm air behind it, preventing excessively warm air from stagnating in the top and overheating the top of the panel.

Although the preferred embodiment of the present invention has been shown and described, it will be apparent to those skilled in the art that many changes and modifications may be made without departing from the invention in its broader aspects. The appended claims are therefore intended to cover all such changes and modifications as fail within the true spirit and scope of the invention.

I claim:

1. A solar panel apparatus comprising:
   (a) an upper frame having a front surface;
   (b) a lower frame having a front surface;
   (c) a support base; and
   (d) a mast;
   wherein the front surface of the upper frame is pivotally connected to the front surface of the lower frame via a first hinge:
   wherein the upper frame comprises a top wall, a first side wall, and a second side wall;
      wherein the top wall of the upper frame comprises a first end and a second end;
      wherein the first end of the top wall of the upper frame is attached to a top end of the first side wall, and the second end of the top wall is attached to a top end of the second side wall;
      wherein the top wall, first side wall and second side wall of the tipper frame are configured to form a first interior cavity;
   wherein the lower frame comprises a bottom wall, a first side wall and a second side wall;
      wherein the bottom wall of the lower frame comprises a first end and a second end;
      wherein the first end of the bottom wall of the lower frame is attached to a bottom end of the first side walk and the second end of the bottom w all is attached to a bottom end of the second side wall;
      wherein the bottom wall, first side wall and second side wall of the lower frame are configured to form a second interior cavity;
   wherein the support base is configured to support the mast in an upright position;
   wherein a solar panel comprised of a plurality of photovoltaic cells is situated at a front part of the upper frame:
   wherein a plurality of louvres is situated inside of the second interior cavity;
   wherein the lower frame further comprises a front panel that is comprised of a material that allows solar rays to penetrate the from panel and hit the louvres;
   wherein a first dividing wall is situated within the upper frame in between the solar panel and a back panel of the upper frame;
      wherein the first dividing wall is configured to create a first gap between a top edge of the first dividing wall and an inner surface of the top wall of the upper frame;
   wherein a second dividing wall is situated within the lower frame between the front panel and a back panel of the lower frame; and
      wherein the second dividing wall is configured to create a second gap between a bottom edge of the second dividing wall and an inner surface of the bottom wall of the lower frame.

2. The solar panel apparatus of claim 1, wherein each, of the upper frame and the lower frame is rectangular in shape.

3. The solar panel apparatus of claim 1, wherein the first hinge extends across an entire width of a bottom end of the front surface of the upper frame and an entire width of a top end of the front surface of the lower frame.

4. The solar panel apparatus of claim 1, wherein the bottom end of the first side wall of the upper frame is cut at an angle such that a from end of the first side wall is longer than a rear end of the first side wall;
   wherein the bottom end of the second side wall of the upper frame is cut at an angle such that a front end of the second side wall is longer than a rear end of the second side wall;
   wherein the top end of the first side wall of the lower frame is cut at an angle such that a front end of the first side wall is longer than a rear end of the first side wall; and
   wherein the top end of the second side wall of the lower frame is cut at an angle such that a front end of the second side wall is longer than a rear end of the second side wall.

5. The solar panel apparatus of claim 1, further comprising:
   a first protective cover that is connected to the bottom end of the first side wall of the upper frame and a top part of the first side wall of the lower frame; and
   a second protective cover that is connected to the bottom end of the second side wall of the upper frame and a top part of the second side wall cri the lower frame.

6. The solar panel apparatus of claim 1, further comprising a lever arm that is pivotally attached at a distal end of the lever arm to a bottom part of the lower frame via a first bracket.

7. The solar panel apparatus of claim 1, wherein a top end of the mast is pivotally attached to a second bracket; and wherein the second bracket is configured to support the back panel of the upper frame.

8. The solar panel apparatus of claim 1, wherein each louvre in the plurality of louvres has a front surface and a rear surface; and
   wherein the front surface of each louvre is black, and the rear surface of each louvre is white.

9. The solar panel apparatus of claim 1, wherein each louvre in the plurality of louvres pivots about a horizontal axis; and
   wherein the individual louvres within the plurality of louvres are stacked on top of one another in a vertical configuration.

10. The solar panel apparatus of claim 1, wherein two first tension springs are attached at one end of each spring to a bottom part of the first dividing wall and at another end of each spring to an outer flap; and
   wherein a top part of the outer flap is attached to a bottom edge of the back panel via a second hinge.

11. The solar panel apparatus of claim 1, further comprising a bracket assembly that is configured to maneuver the plurality of louvres between a first position and a second position.

12. The solar panel apparatus of claim 1, wherein two first tension springs are attached at one end of each spring to a top part of an inner flap and at another end of each spring to a bottom part of the upper frame; and
   wherein a top part of the inner flap is attached to a bottom edge of the first dividing wall via a third hinge.

13. The solar panel apparatus of claim 1, wherein the back panel oi the upper frame comprises a first air vent, and the back panel of the lower frame comprises a second air vent; and wherein each of the first and second air vents is configured to open as air within the first and second cavities increases in temperature and to close as air within the first and second cavities decreases in temperature.

* * * * *